(12) United States Patent
Savarit et al.

(10) Patent No.: US 9,846,039 B2
(45) Date of Patent: Dec. 19, 2017

(54) METHOD OF COMPUTING LATERAL TRAJECTORIES

(71) Applicant: THALES, Courbevoie (FR)

(72) Inventors: Vincent Savarit, Toulouse (FR);
Emmanuel Dewas, Toulouse (FR);
Yohann Combes, Leguevin (FR)

(73) Assignee: Thales, Courbevoie (*) Notice: Subject to any disclaimer, the term of this patent is extended or adjusted under 35 U.S.C. 154(b) by 257 days.

(21) Appl. No.: 14/671,943

(22) Filed: Mar. 27, 2015

(65) Prior Publication Data

US 2015/0276411 A1 Oct. 1, 2015

(30) Foreign Application Priority Data

Mar. 28, 2014 (FR) .................................. 14 00754

(51) Int. Cl.
*G01C 21/00* (2006.01)
*G08G 5/06* (2006.01)
*G08G 5/00* (2006.01)

(52) U.S. Cl.
CPC ............ *G01C 21/00* (2013.01); *G08G 5/065* (2013.01); *G08G 5/0013* (2013.01)

(58) Field of Classification Search
None
See application file for complete search history.

(56) References Cited

U.S. PATENT DOCUMENTS

| 6,405,124 B1* | 6/2002 | Hutton | ................ | G01C 21/00 |
| | | | | 701/122 |
| 2006/0200279 A1* | 9/2006 | Ainsworth | ............ | G08G 5/025 |
| | | | | 701/16 |

(Continued)

FOREIGN PATENT DOCUMENTS

GB 2475378 A 5/2011

OTHER PUBLICATIONS

"Standard Rate Turn" published at internet web address https://en.wikipedia.org/wiki/Standard_rate_turn, proven to published on or before Jun. 20, 2011 via internet archive https://web.archive.org.*

(Continued)

*Primary Examiner* — Todd Melton
*Assistant Examiner* — Jason Roberson
(74) *Attorney, Agent, or Firm* — Baker Hostetler LLP

(57) ABSTRACT

A method of computing an aircraft trajectory, between a departure point and an arrival point, comprises: loading the departure point and a departure angle; determining two waypoints; loading the arrival point and an arrival angle; determining two departure circles of respectively left and right type, which are tangent to the oriented departure straight line respectively on the left and on the right, and passing respectively through the waypoint of left type and through waypoint of right type; determining two arrival circles of respectively left and right type which are tangent to the oriented arrival straight line respectively on its left and on its right and passing through the arrival point; determining a plurality of continuous geometric lateral trajectories comprising an initial portion comprising a portion of a departure circle, a final portion equal to a portion of an arrival circle, and an intermediate portion.

16 Claims, 16 Drawing Sheets

(56) References Cited

U.S. PATENT DOCUMENTS

| | | | | |
|---|---|---|---|---|
| 2009/0082955 A1* | 3/2009 | Sacle | .................. | G08G 5/0034 701/467 |
| 2011/0118980 A1* | 5/2011 | Hoy | .................... | G05D 1/0202 701/301 |
| 2012/0150426 A1* | 6/2012 | Conway | ............... | G08G 5/0026 701/120 |
| 2012/0158220 A1* | 6/2012 | Accardo | .............. | G05D 1/0646 701/15 |

OTHER PUBLICATIONS

"Official Guide to Basic Flight Information and ATC Procedures", Feb. 9, 2012, XP55167122, URL:http://www.ascentgroundschool.com/index.php/faa-references/aim/24-chapter-1-air-navigation-section-2-area-navigation-rnav-and-required-navigation-performance-rn.

R. Ed Walter, et al., "The Avionics Handbook, Chapter 15: Flight Management Systems", Jan. 1, 2001, The Avionics Handbook; [The Electrical Engineering Handbook Series], pp. 1-25, CRC Press, Boca Raton, FL, XP002648022.

* cited by examiner

REPLACEMENT SHEET

METHOD OF COMPUTING LATERAL TRAJECTORIES

CROSS-REFERENCE TO RELATED APPLICATION

This application claims priority to foreign French patent application No. FR 1400754, filed on Mar. 28, 2014, the disclosure of which is incorporated by reference in its entirety.

FIELD OF THE INVENTION

The present invention relates to a method of computing continuous geometric lateral trajectories between a departure point and an arrival point. It applies notably to the field of avionics, and more particularly to flight management devices customarily referred to by the acronym FMS standing for the expression "Flight Management System".

BACKGROUND

Most current aircraft possess a flight management system, for example of the FMS type, according to the acronym standing for the term "Flight Management System". These systems allow help with navigation, by displaying information useful to pilots, or else by communicating flight parameters to an automatic piloting system.

Notably, a system of FMS type allows a pilot or some other qualified person, to input, in pre-flight, a flight plan defined by a departure point of the flight plan, an arrival point of the flight plan, and a series of transit points or waypoints, customarily referred to by the abbreviation WPT. All these points can be chosen from among points predefined in a navigation database, and which correspond to airports, radionavigation beacons, etc. The points can also be defined by their geographical coordinates and their altitude.

The inputting of the transit points can be done through a dedicated interface, for example a keyboard or a touchscreen, or else by transferring data from an external device.

A flight plan then consists of a succession of segments, or "legs" according to the terminology customarily employed in this technical field.

Other data can be entered into the flight management system, notably data relating to the aircraft's load plan and to the quantity of fuel on board.

When the aircraft is in flight, the flight management system precisely evaluates the position of the aircraft and the uncertainty in this item of data, by centralizing the data originating from the various positioning devices, such as the satellite based geo-positioning receiver, the radionavigation devices: for example DME, NDB and VOR, the inertial platform, etc.

A screen allows the pilots to view the current position of the aircraft, as well as the route followed by it, and the closest transit points, the whole on a map background making it possible to simultaneously display other flight parameters and landmark points. The information viewed allows notably pilots to tailor flight parameters, such as heading, thrust, altitude, rates of climb or descent, etc. or else simply to control the proper progress of the flight if the aircraft is piloted in an automatic manner. The computer of the flight management system makes it possible to determine an optimal flight geometry, notably in the sense of a reduction in operating costs related to fuel consumption.

FIG. 1 presents a summary chart illustrating the structure of a flight management system of FMS type, known from the prior art.

A system of FMS type 100 employs a man-machine interface 120 comprising for example a keyboard and a display screen, or else simply a touch-type display screen, as well as at least the following functions, described in the aforementioned ARINC 702 standard:

Navigation (LOCNAV) 101, for performing optimal location of the aircraft as a function of the geo-location means 130 such as satellite or GPS, GALILEO based geo-positioning, VHF radionavigation beacons, inertial platforms. This module communicates with the aforementioned geo-location devices;

Flight plan (FPLN) 102, for inputting the geographical elements constituting the skeleton of the route to be followed, such as the points imposed by the departure and arrival procedures, the waypoints, the airways (or air corridors);

Navigation database (NAVDB) 103, for constructing geographical routes and procedures with the aid of data included in the bases relating to the points, beacons, interception or altitude legs, etc.;

Performance database, (PRFDB) 104, containing the craft's aerodynamic and engine parameters;

Lateral trajectory (TRAJ) 105, for constructing a continuous trajectory on the basis of the points of the flight plan, complying with the performance of the aircraft and the confinement constraints (RNP);

Predictions (PRED) 106, for constructing an optimized vertical profile on the lateral and vertical trajectory. The functions forming the subject of the present invention affect this part of the computer;

Guidance (GUID) 107, for guiding the aircraft in the lateral and vertical planes on its three-dimensional trajectory, while optimizing its speed. In an aircraft equipped with an automatic piloting device 110, the latter can exchange information with the guidance module 107;

Digital data link (DATALINK) 108 for communicating with control centres and other aircraft 109.

The flight plan is entered by the pilot, or else by data link, with the aid of data contained in the navigation database. A flight plan typically consists of a succession of segments, customarily referred to by the name "legs", which are formed of a termination and of a geometry, for example a geometry of turning type, or else of great circle or rhumb line straight line type. The various types of legs are defined in the ARINC 424 international standard.

The pilot thereafter inputs the parameters of the aircraft: mass, flight plan, span of cruising levels, as well as a or a plurality of optimization criteria, such as the Cl. These inputs allow the modules TRAJ 105 and PRED 106 to compute respectively the lateral trajectory and the vertical profile, that is to say the flight profile in terms of altitude and speed, which for example minimizes the optimization criterion.

During the flight, it may turn out to be necessary, for a civil or military need, to shorten the flight plan by directly rejoining a point of the flight plan not corresponding to the first point to be rejoined, and to continue the initial planning onwards of the latter point. The pilot may also be led to quit the trajectory of a flight plan during the flight, for example following requests by the air traffic control bodies, either with the aim of circumventing an obstacle generated by unfavourable meteorological conditions, or simply with the objective of saving time or fuel consumption, etc. In such situations, it is necessary that the aircraft rejoin the flight plan, onwards of the instant at which the constraint no longer applies.

It is then desirable that the most realistic possible rejoining trajectory be determined, and taken into account by the FMS for the predictive computations, notably in respect of flight time and fuel consumption.

If the pilot desires to shorten the flight plan or reintegrate the flight plan at a selected navigation point, two possibilities are offered him according to the prior art, such as illustrated in FIG. 2.

FIG. 2a illustrates the initial trajectory 20 of the aircraft 10 according to the flight plan FP: the aircraft has just crossed the navigation point WPa and is steering towards the following point WPb of the flight plan, which it must pass without overflight, and then it must steer towards the navigation point WPc, which it must also traverse without overflight and then steer towards the point WPd.

FIG. 2b illustrates the "DirTo" function according to the prior art: it consists in asking the FMS to compute a direct trajectory 21 to the selected point, here WPc. The effect is the modification of the arrival vector or arrival "course" at the point and therefore of the trajectory which follows the point.

The "course" is defined as the angle made by the trajectory of the aircraft at a given point with respect to a direction of reference, typically North (which may be referenced as magnetic North or as true North). The transition for rejoining the desired point WPc amounts to making a turn in the "logical" direction of the point, the consequence of which is to modify the rest of the trajectory.

FIG. 2c illustrates the function "DirTo Course In" (or "DirTo Radial In"): here the FMS computes a rejoining straight line 22 as a function of a given course towards a given point. If the straight line is computed with the course advised by the FMS (corresponding to the initial trajectory for passing the point WPc), then there will be no trajectory modification after the point WPc. On the other hand in the present case the FMS does not compute any continuous trajectory flyable from the aeroplane up to the rejoining straight line 22: it is the pilot's responsibility to fly the trajectory that he desires manually, the trajectory cannot be flown in an automatic manner.

The problematic issue can be generalized to the computation of continuous trajectories between a departure point according to a departure course and an arrival point according to an arrival course, corresponding to an alignment constraint upon arrival at the point considered. Thus no function allowing the computation of continuous lateral trajectories such as these currently exists in an FMS.

An aim of the present invention is to alleviate the aforementioned drawbacks, by proposing a method of computing continuous geometric trajectories of an aircraft between a departure point and a departure course and an arrival point while complying with an alignment constraint so as to arrive at this point.

SUMMARY OF THE INVENTION

The subject of the present invention is a method of computing an aircraft trajectory, between a departure point and an arrival point comprising the steps consisting in:
  loading the departure point and a departure angle with vertex the departure point, separating a first reference straight line and a departure straight line oriented according to the sense of displacement of the aircraft at the departure point,
  determining two waypoints of respectively left and right type on the basis of the departure point,
  loading the arrival point and an arrival angle with vertex the arrival point, separating a second reference straight line and an arrival straight line oriented according to the sense of displacement of the aircraft at the arrival point,
  loading a departure speed and an arrival speed of the aircraft,
  determining two departure circles of respectively left and right type, which are tangent to the oriented departure straight line respectively on the left and on the right, and passing respectively through the waypoint of left type and through waypoint of right type, the said circles exhibiting a departure radius determined on the basis of the departure speed,
  determining two arrival circles of respectively left and right type which are tangent to the oriented arrival straight line respectively on its left and on its right and passing through the arrival point, the said circles exhibiting an arrival radius determined on the basis of the arrival speed,
  determining a plurality of continuous geometric lateral trajectories comprising an initial portion comprising a portion of a departure circle, a final portion equal to a portion of an arrival circle, and an intermediate portion, such that the sense of displacement of the aircraft on the initial portion and the final portion coincides with the sense respectively of the oriented departure straight line at the departure point and the oriented arrival straight line at the arrival point,
  computing a plurality of predicted trajectories by using the equations of flight mechanics for the aircraft on the basis of the plurality of geometric trajectories as a function of a global state of the aircraft.

Advantageously the waypoints of left and right type correspond to the departure point translated respectively by a left translation distance and by a right translation distance, as a function of the state of the position of the wings of the aircraft at the departure point.

According to one embodiment, the step of determining the two waypoints consists in:
  loading a state of the position of the wings of the aircraft at the chosen departure point corresponding to an angle of inclination of the wings with respect to the horizon,
and in which:
  when the state of the aircraft is wings level, the right and left translation distances are identical and equal to a first distance of turning of the aircraft, the waypoints of right and left type coinciding,
  when the state of the aircraft is a turn engaged of a type from among left and right:
    the translation distance is less than or equal to the first distance (d1) for the waypoint of the said type,
    the translation distance is equal to a second distance of turning for the waypoint of the other type.

According to one embodiment the radius of the departure and arrival circles is computed according to the following formula:

$$Ri = V_i^2 / g \cdot tg(\phi)$$

With i=d or a,
R departure radius Rd or arrival radius Ra
V departure speed Vd or arrival speed Va
g gravitational constant
φ angle of roll of the aircraft for carrying out a turn.

According to one embodiment the step of determining the plurality of trajectories comprises a sub-step consisting in:
  determining a first and a second trajectories comprising an initial portion comprising a portion according to respectively the left departure circle and the right departure circle, a final portion according to respectively the left arrival circle and the right arrival circle, and an intermediate portion equal to the straight line segment externally tangent both to the left departure circle and to the left arrival circle for the first trajectory, and to the right departure circle and to the right arrival circle for the second trajectory, when the departure circle and the arrival circle are not included one in the other.

According to one embodiment, the step of determining the plurality of trajectories comprises, when the left departure circle is disjoint from the right arrival circle, a sub-step consisting in:
  determining a third trajectory comprising an initial portion comprising a portion according to the left departure circle, a final portion according to the right arrival circle and an intermediate portion equal to the straight line segment internally tangent to the left departure circle and to the right arrival circle, and furthermore comprises, when the right departure circle is disjoint from the left arrival circle, a sub-step consisting in:
  determining a fourth trajectory comprising an initial portion comprising a portion according to the right departure circle, a final portion according to the left arrival circle, and an intermediate portion equal to the straight line segment internally tangent to the right departure circle and to the left arrival circle.

According to one embodiment, the step of determining the plurality of trajectories furthermore comprises a sub-step (376) consisting in computing a mean radius on the basis of the departure and arrival radii.

According to one embodiment, the step of determining the plurality of trajectories furthermore comprises the sub-steps consisting in:
  determining a first and a second tangent circles external to the departure and arrival circle of left type and of radius equal to the mean radius when the departure circle and arrival circle of left type are a value of less than twice the mean radius apart,
  determining a fifth and a sixth trajectories comprising an initial portion comprising a portion according to the left departure circle, a final portion according to the left arrival circle and an intermediate portion equal to a portion respectively of the first and of the second external tangent circle.

According to one embodiment the step of determining the plurality of trajectories furthermore comprises the sub-steps consisting in:
  determining a third and a fourth tangent circles external to the departure and arrival circle of right type and of radius equal to the mean radius, when the departure circle and arrival circle of right type are a value of less than twice the mean radius apart,
  determining a seventh and an eighth trajectories comprising an initial portion comprising a portion according to the right departure circle, a final portion according to the right arrival circle and an intermediate portion equal to a portion respectively of the third and of the fourth external tangent circle.

Advantageously the mean radius is equal to sum divided by two of the departure radius and of the arrival radius.

Advantageously, the method according to the invention comprises a step consisting in determining an optimal geometric trajectory from among the plurality of geometric trajectories according to a first criterion chosen in the group comprising: the shortest trajectory by distance; the trajectory minimizing an aggregate angle.

Advantageously, the method according to the invention furthermore comprises a step consisting in determining an optimal predicted trajectory from among the plurality of trajectories predicted according to a second criterion chosen in the group comprising: the trajectory minimizing fuel consumption; the trajectory minimizing travel time.

According to a variant, the departure point corresponds to a current position of the aircraft and the departure angle corresponds to a current direction followed by the aircraft.

According to a variant, the arrival point and the arrival angle are determined by the pilot.

According to a variant the aircraft follows a flight plan comprising an ordered series of navigation points remaining to be traversed comprising preliminary steps consisting in:
  loading a target navigation point corresponding to a navigation point of the flight plan remaining to be traversed and at least one associated operational need,
  determining the arrival point and the arrival vector, the arrival point being situated upstream of the target point, as a function of the said operational need associated with the target point.

According to another aspect, the invention relates to a system for computing trajectory of an aircraft, between a departure point and an arrival point, comprising a flight management computer and lines of computer code intended to be executed on the computer, the lines of computer code comprising instructions for executing the method according to the invention.

The system comprises:
  a module for loading a departure point, a departure angle with vertex the departure point, separating a first reference straight line and a departure straight line oriented according to the sense of displacement of the aircraft at the departure point, and a departure speed of the aircraft,
  a module for loading an arrival point, an arrival angle with vertex the arrival point, separating a second reference straight line and an arrival straight line oriented according to the sense of displacement of the aircraft at the arrival point, and an arrival speed of the aircraft,
  a module for determining two waypoints of respectively left and right type on the basis of the departure point,
  a module for determining two departure circles of respectively left and right type, which are tangent to the oriented departure straight line respectively on the left and on the right, and passing respectively through the waypoint of left type and through waypoint of right type, the circles exhibiting a departure radius determined on the basis of the departure speed,
  a module for determining two arrival circles of respectively left and right type which are tangent to the oriented arrival straight line respectively on its left and on its right and passing through the arrival point, the circles exhibiting an arrival radius determined on the basis of the arrival speed,
  a module for determining a plurality of continuous geometric lateral trajectories comprising an initial portion comprising a portion of a departure circle, a final portion equal to a portion of an arrival circle, and an intermediate portion, such that the sense of displacement of the aircraft on the initial portion and the final portion coincides with the sense respectively of the oriented departure straight line at the departure point and the oriented arrival straight line at the arrival point.

Advantageously, the system according to the invention furthermore comprises:
- a module for determining an optimal geometric trajectory from among the plurality of geometric trajectories according to a first criterion chosen in the group comprising: the shortest trajectory by distance; the trajectory minimizing an aggregate angle;

and/or
- a module for computing a plurality of predicted trajectories of the aircraft on the basis of the plurality of geometric trajectories as a function of a global state of the aircraft coupled to a module for determining an optimal predicted trajectory from among the plurality of trajectories predicted according to a second criterion chosen in the group comprising: the trajectory minimizing fuel consumption; the trajectory minimizing travel time.

Finally according to a last aspect, the invention pertains to a computer program product, the computer program comprising code instructions making it possible to perform the steps of the method according to the invention.

BRIEF DESCRIPTION OF THE DRAWINGS

Other characteristics, aims and advantages of the present invention will become apparent on reading the detailed description which will follow and with regard to the appended drawings given by way of nonlimiting examples and in which.

DETAILED DESCRIPTION

Figure 3:
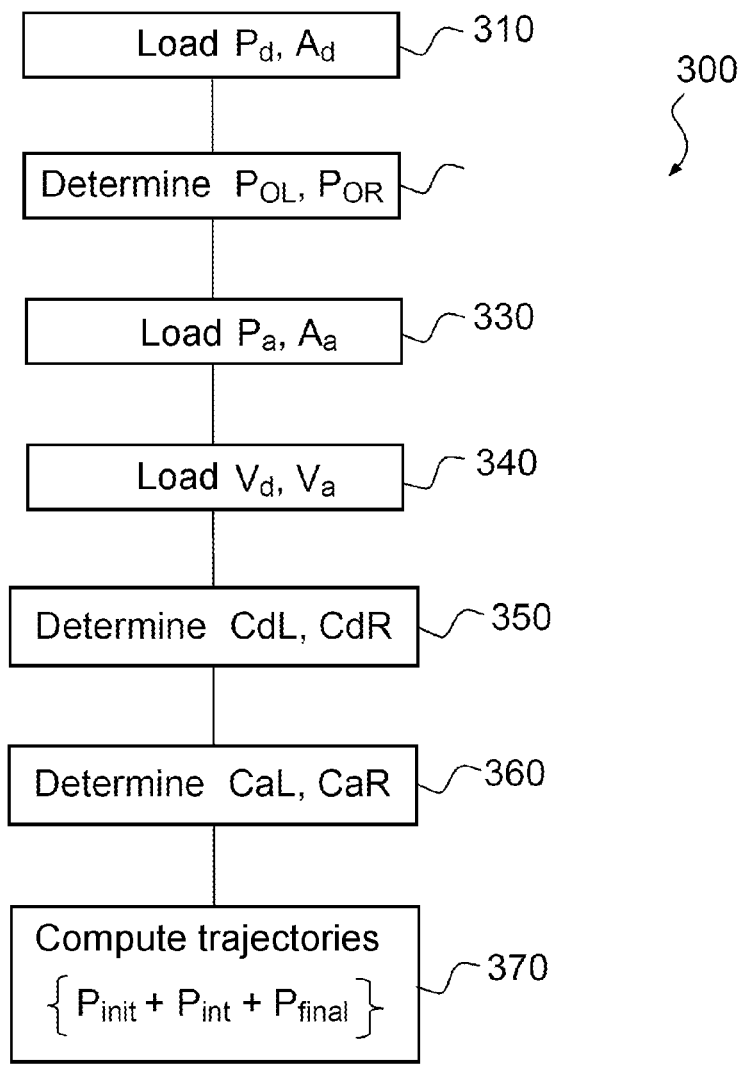
FIG. 3 shows diagrammatically the steps of the method according to the invention.

The aircraft trajectory computation method 300 according to the invention is illustrated in FIG. 3. The method computes a trajectory between a departure point Pd and an arrival point Pa making it possible to rejoin the latter while arriving aligned with a given arrival course. The functionality associated with the method is dubbed "Dir To Aligned".

Figure 4:
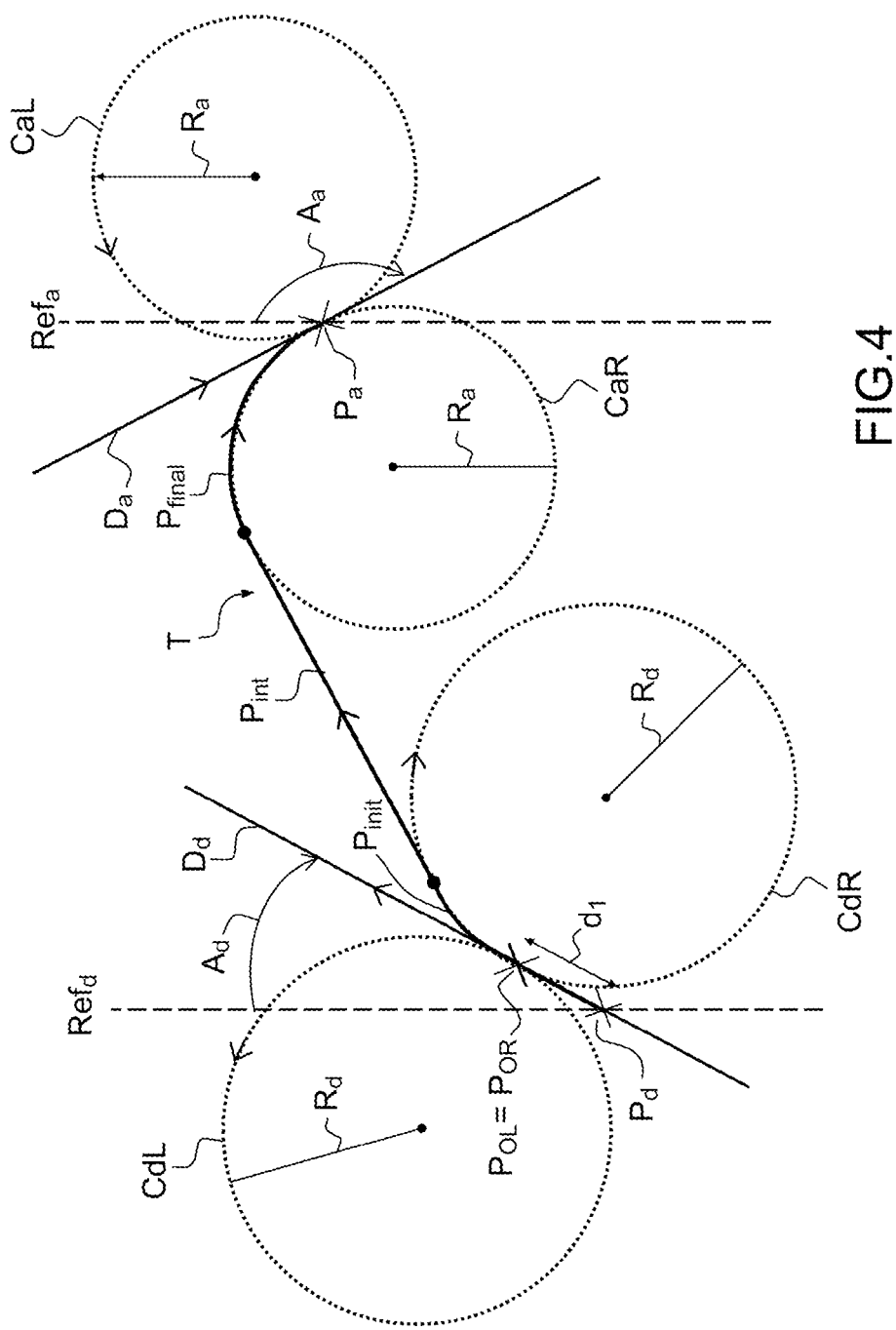
FIG. 4 illustrates the determination of the departure and arrival circles of the method according to the invention.

The method 300 comprises the following steps:

A step 310 loads the departure point Pd and a departure angle Ad with vertex the departure point Pd and which separates a first reference straight line Refd and a departure straight line Dd oriented according to the sense of displacement of the aircraft at the departure point, such as illustrated in FIG. 4. For an aircraft during navigation, the reference straight line Refd is conventionally the direction of North (magnetic or true according to the reference selected by the pilot). The departure angle Ad is also dubbed the "departure course". The value of this angle Ad determines the sense of displacement of the aircraft on the straight line Dd, as symbolized by an arrow on the straight line Dd.

A step 320 determines two waypoints P0L and P0R of respectively left and right type on the basis of the departure point Pd. These waypoints P0L and P0R belong to the departure straight line Dd downstream of the departure point Pd (or coincide with it) with respect to the sense of displacement. These points model the distance required by the aeroplane to effect the roll required for the turn (modelled by the circles defined in step 350, see further on).

A step 330 loads the arrival point Pa and an arrival angle Aa with vertex the arrival point, which separates a second reference straight line Refa and an arrival straight line Da oriented according to the desired sense of displacement of the aircraft at the arrival point. In aeronautics, the reference straight line Refa corresponds to the direction of North (magnetic or true, according to the reference selected by the pilot) at the arrival point Pa. The arrival angle Aa is also dubbed the "arrival course". The value of this angle Aa determines the desired sense of displacement of the aircraft on the straight line Da while arriving at Pa, as symbolized by an arrow on the straight line Da.

A step 340 loads a departure speed Vd and a desired arrival speed Va of the aircraft.

Once these data Pd, Ad, Vd, Pa, Aa, Va relating to the departure point and to the arrival point have been loaded, a step 350 determines two departure circles illustrated in FIG. 4:

a departure circle of left type CdL tangent to the oriented departure straight line Dd on its left and passing through the waypoint of left type P0L, a departure circle of right type CdR, tangent to the oriented departure straight line Dd on its right and passing through the waypoint of right type P0R.

The two circles CdL and CdR exhibit an identical departure radius Rd determined on the basis of the departure speed Vd.

In step 360 the method determines two arrival circles also illustrated in FIG. 4:

an arrival circle of left type CaL tangent to the oriented arrival straight line Da on its left and passing through the arrival point Pa, an arrival circle of right type CaR tangent to the oriented arrival straight line Da on its right and also passing through the arrival point Pa.

The two circles CaL and CaR exhibit an identical arrival radius Ra determined on the basis of the desired arrival speed Va.

In step 370 the method determines a plurality of continuous geometric lateral trajectories, an example T of which is shown diagrammatically in FIG. 4. A trajectory comprises:

an initial portion Pinit comprising a portion of a departure circle, a final portion Pfinal equal to a portion of an arrival circle, and an intermediate portion Pint which links the initial portion and the final portion.

The trajectory is computed while taking account of the sense of displacement of the aircraft at the arrival and departure points, that is to say the sense of displacement of the aircraft on the initial portion coincides with the sense of the oriented departure straight line Dd at the departure point Pd, and the sense of displacement of the aircraft on the final portion coincides with the sense of the oriented arrival straight line Da at the arrival point Pa. A trajectory taking a departure circle "backwards" or arriving at the arrival point in the opposite sense to the sense of the arrival straight line is impossible.

Figure 1:
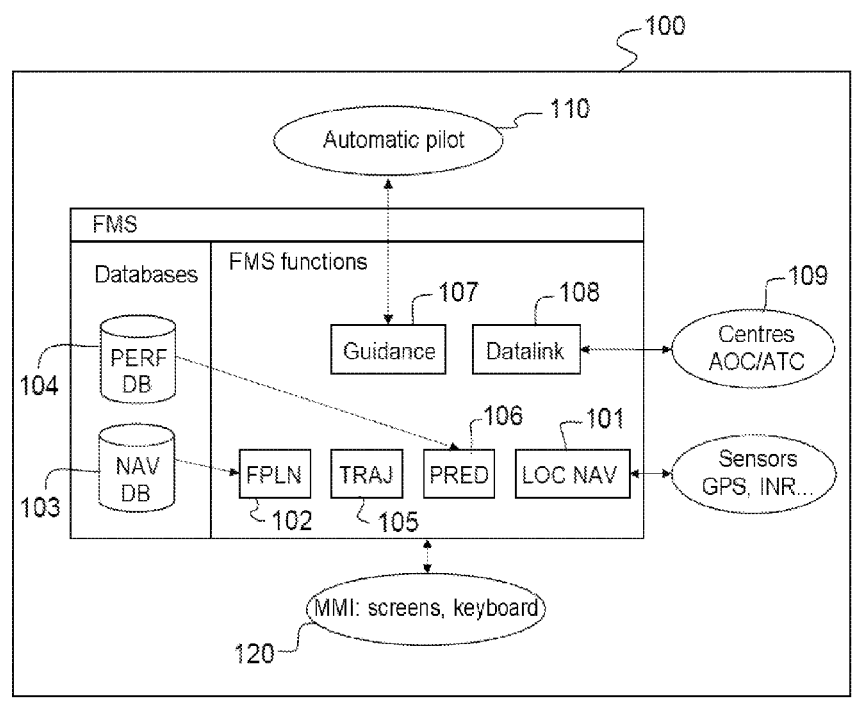
FIG. 1 already cited presents a summary chart illustrating the structure of a flight management system of FMS type, known from the prior art.
Figure 2A:
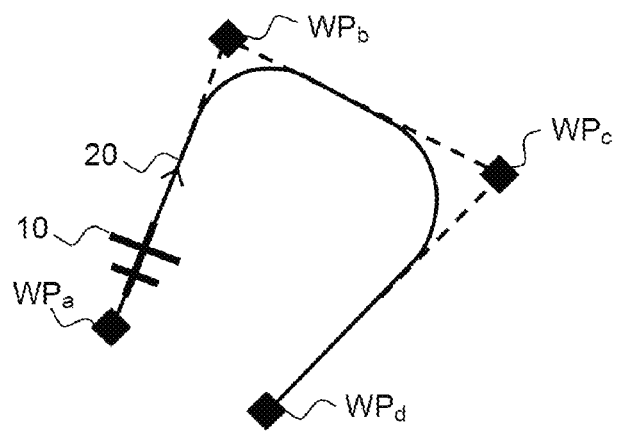
FIGS. 2a-2c already cited illustrate the functions known from the prior art making it possible to rejoin or to help to rejoin a navigation point different from the navigation point following the flight plan.
Figure 2B:
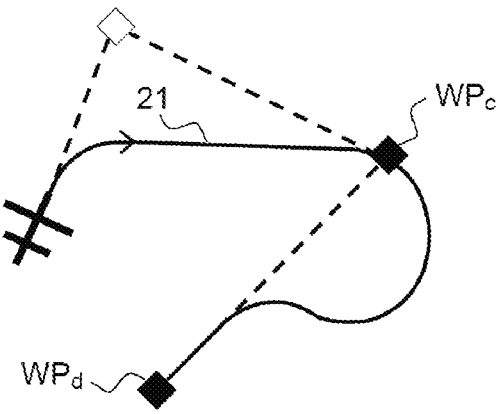
Figure 2C:
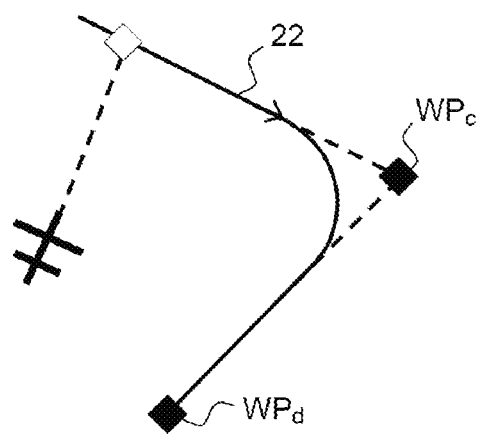

Thus the method makes it possible to compute at least one continuous lateral trajectory making it possible to rejoin the arrival point while arriving aligned with a predetermined arrival course, in contradistinction to the case of FIG. 2c. The aircraft can thus, once having arrived according to an arrival circle tangent to the point Pa, immediately resume a specific scheduled trajectory, it is "on the axis" of this scheduled trajectory (taking into account an alignment constraint Da), in contradistinction to the case of FIG. 2b. For example when the aircraft must rejoin the trajectory of a flight plan FP, the method makes it possible to determine at least one trajectory allowing it to rejoin the scheduled trajectory of the flight plan at the point Pa and to continue on this scheduled trajectory. The rest of the flight plan is thus not disturbed.

In a step 400, a plurality of predicted trajectories is computed by using the equations of flight mechanics for the aircraft on the basis of the plurality of geometric trajectories as a function of a global state of the aircraft. Thus actual trajectories of the aircraft are computed on the basis of the previously computed geometric trajectories.

According to a preferred embodiment, the waypoints of left P0L and right P0R type correspond to the departure point Pd translated respectively by a left translation distance dL and by a right translation distance dR, as a function of the state of the position of the wings of the aircraft at the departure point Pd.

Figure 5:
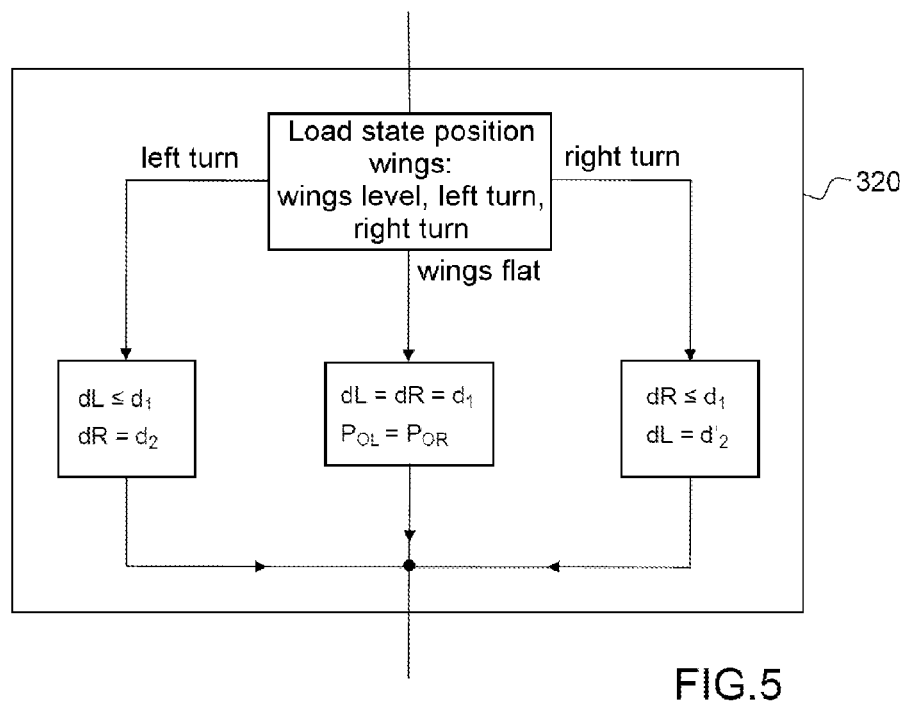
FIG. 5 illustrates a preferred embodiment of the step of determining the two waypoints of the method according to the invention.

According to a preferred embodiment illustrated in FIG. 5, step 320 of determining the two waypoints P0L and P0R consists in:

loading a state of the position of the wings of the aircraft at the chosen departure point corresponding to the angle of inclination of the wings with respect to the horizon. Typically the aircraft can be wings level, or left turn engaged, or right turn engaged.

When the state of the aircraft is wings level, corresponding to an angle of inclination of 0° degrees, the right dR and left dL translation distances are identical and equal to a first distance d1 of turning of the aircraft, with the waypoints of right and left type coinciding: P0L=P0G, as illustrated in FIG. 4. Indeed to be able to take a trajectory according to one of the departure circles, the aircraft being wings level must firstly begin turning. The initial portion of trajectory Pinit comprises in this case the right segment of length d1 along Da and then a portion of one of the departure circles.

When the state of the aircraft is a turn engaged of left type, the translation distance dL is less than or equal to d1, or in fact zero for the waypoint of left type P0L, and the right translation distance dR is equal to a second distance d2 (greater than d1) of turning for the waypoint of P0R right type.

Figure 6:
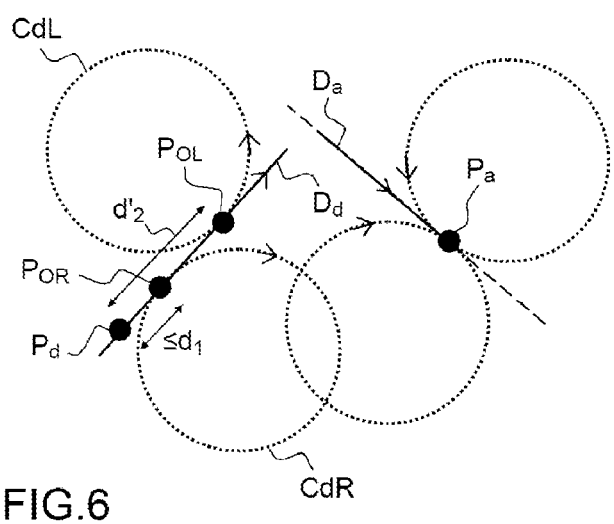
FIG. 6 illustrates determination of the translation distance of the method according to the invention.

Conversely, as illustrated in FIG. 6, when the state of the aircraft is a turn engaged of right type, the translation distance dR is less than or equal to d1 or in fact zero for the waypoint of right type P0R, and the translation distance dL is equal to a second distance d2' (greater than d1) of turning for the waypoint P0G of left type.

Indeed, when the aircraft has already engaged a turn on the same side as the departure tangent circle (right side in FIG. 6) that it will follow, it can take it immediately (CdR in FIG. 6). On the other hand, if it has already engaged a turn on the opposite side to the tangent circle that it will follow, it must firstly straighten its wings and then set them according to the appropriate turn before being able to take the circle (CdG in FIG. 6). Therefore necessarily d2 is greater than d1.

According to a preferred variant, the radii of the departure and arrival circles are determined with the following conventional formula for computing a turning radius:

$$Rd = V^2_d / g \cdot tg(\phi)$$

$$Ra = V^2_a / g \cdot tg(\phi)$$

g gravitational constant and $\phi$ angle of roll of the aircraft for carrying out a turn. For example for an airliner $\phi=25°$.

This formula is the conventional formula for a turning radius.

We shall now describe examples of trajectories computed by the method 300 according to the invention, while describing more particularly examples of computing intermediate parts Pint.

FIGS. 10, 11, 12, 13, 17 and 18 illustrate various examples of trajectories computed between the points P0L or P0R and the arrival point Pa. These trajectories can of course comprise an additional initial portion between Pd and P0L or P0R if necessary. In these figures the trajectories are plotted with one and the same radius for the departure circles and the arrival circles, corresponding to a nonlimiting particular case. In the general case covered by the invention, the radii Rd and Ra are different.

Figure 7:
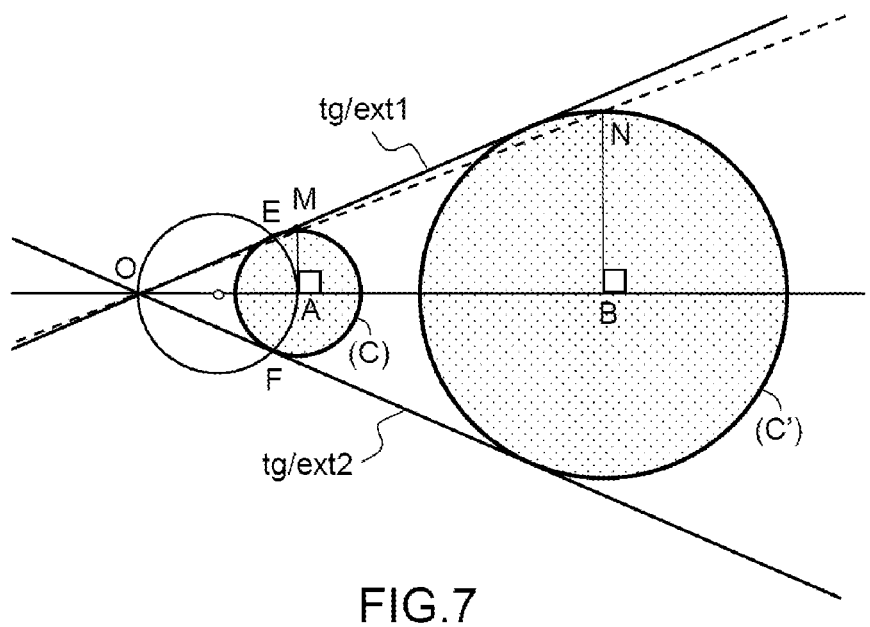
FIG. 7 describes the geometric scheme for determining the two tangents outside two circles.
Figure 8:
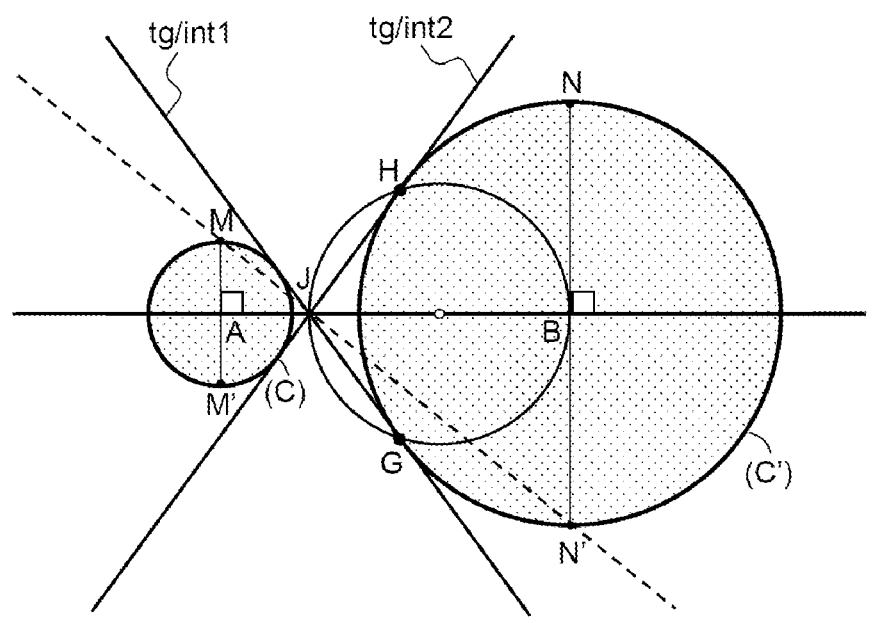
FIG. 8 describes the geometric scheme for determining the two internal tangents to two circles.

FIGS. 7 and 8 describe the geometric notions of straight lines tangent to two circles C and C' with respective centres A and B. Variants of the method determine possible trajectories of the aircraft, as described hereinbelow, on the basis of tangent straight lines.

FIG. 7 describes the geometric scheme for determining the two external tangents tg/ext1 and tg/ext2 to two circles C and C'.

FIG. 8 describes the geometric scheme for determining the two internal tangents tg/int1 and tg/int2 to two circles C and C'.

The two external tangents exist when one circle is not wholly included in the other, while the internal tangents exist when the two circles have an empty intersection.

Figure 9:
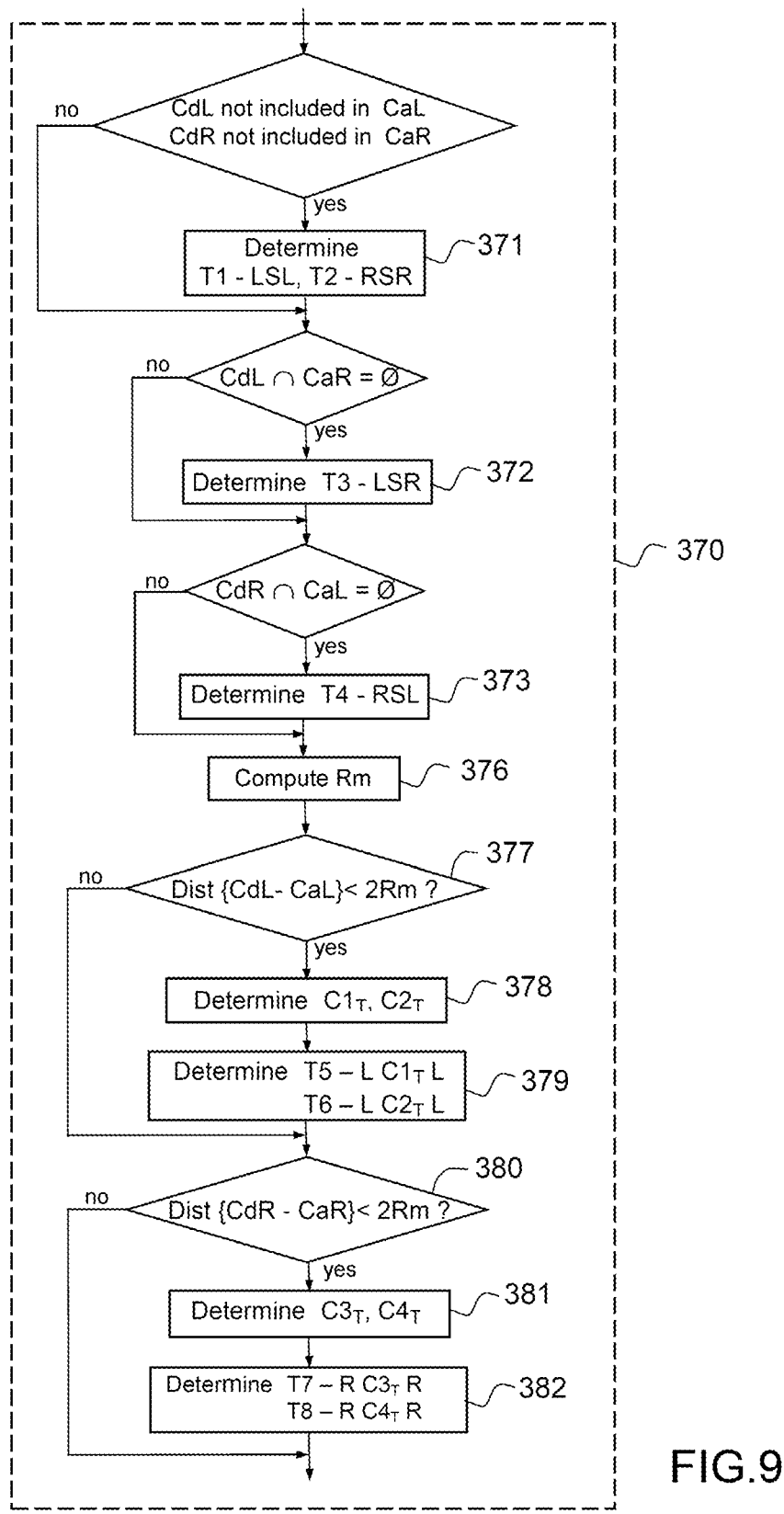
FIG. 9 illustrates a preferred variant of the step of determining the trajectories of the method according to the invention.

According to a preferred variant illustrated in FIG. 9 the step 370 of determining the plurality of trajectories comprises a sub-step 371 consisting in determining

Figure 10:
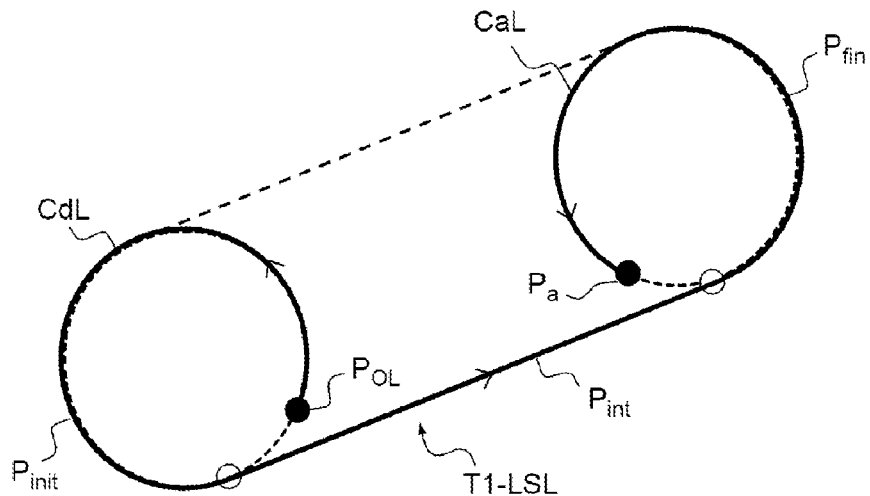
FIG. 10 illustrates the determination of a first trajectory according to a preferred variant of the method according to the invention.
Figure 11:
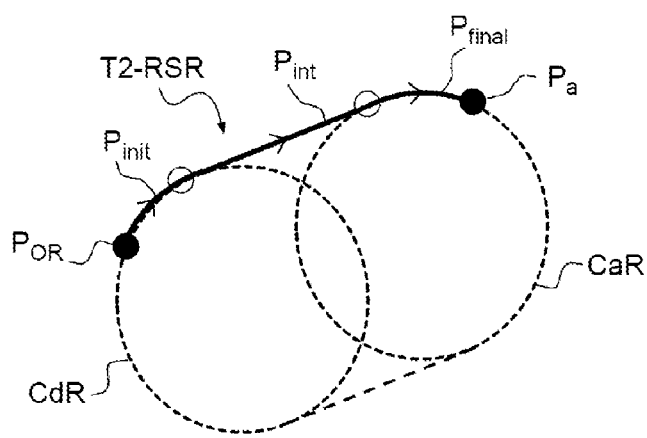
FIG. 11 illustrates the determination of a second trajectory according to a preferred variant of the method according to the invention.

- a first trajectory T1-LSL illustrated in FIG. 10 comprising an initial portion Pinit comprising a portion according to the left departure circle CdL, an intermediate portion equal to the straight line segment externally tangent both to the left departure circle CdL and to the left arrival circle CaL and a final portion according to the left arrival circle CaL.
- a second trajectory T2-RSR illustrated in FIG. 11 comprising an initial portion Pint comprising a portion according to the right departure circle CdR, an intermediate portion equal to the straight line segment externally tangent both to the right departure circle CdR and to the right arrival circle CaR and a final portion according to the right arrival circle CaR.

For each trajectory, the external tangent to be taken into account is determined by the sense of travel of the aircraft on the trajectory, and only one of the two external tangents is possible.

These trajectories can be determined in the case for which the departure and arrival circles in question are not included one in the other, as illustrated in FIG. 11.

Figure 12:
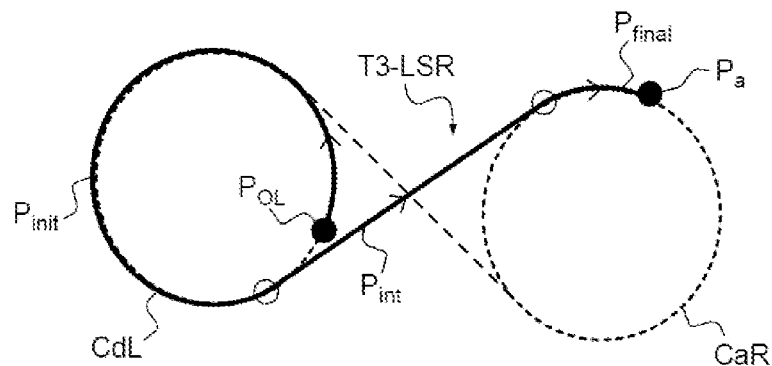
FIG. 12 illustrates the determination of a third trajectory according to a preferred variant of the method according to the invention.

According to another variant, the determining step 370 comprises, when the left departure circle CdL is disjoint (that is to say no intersection and no inclusion) from the right arrival circle CaR, a sub-step 372 consisting in determining a third trajectory T3-LSR illustrated in FIG. 12 comprising an initial portion comprising a portion according to the left departure circle CdL, a final portion according to the right arrival circle CaR and an intermediate portion equal to the straight line segment internally tangent to the left departure circle CdL and to the right arrival circle CaR.

Figure 13:
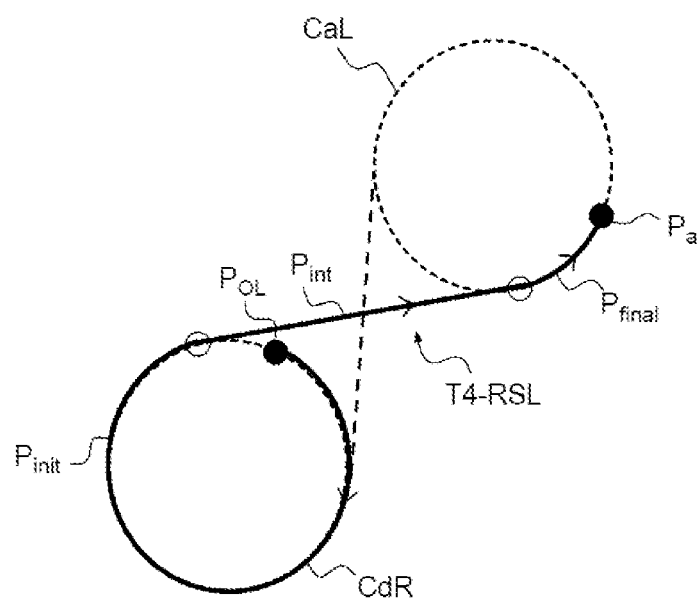
FIG. 13 illustrates the determination of a fourth trajectory according to a preferred variant of the method according to the invention.

The determining step 370 furthermore comprises, when the right departure circle CdR is disjoint (that is to say no intersection and no inclusion) from the left arrival circle CaL, a sub-step consisting 373 in determining a fourth trajectory T4-RSL illustrated in FIG. 13 comprising an initial portion comprising a portion according to the right departure circle CdR, a final portion according to the left arrival circle CaL, and an intermediate portion equal to the straight line segment internally tangent to the right departure circle CdR and to the left arrival circle CaL.

For each trajectory, the internal tangent to be taken into account is determined by the sense of travel of the aircraft on the trajectory, and only one of the two internal tangents is possible.

Figure 14:
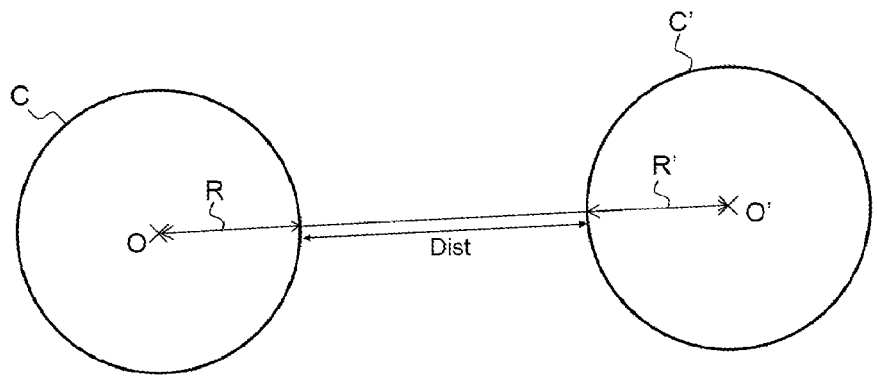
FIG. 14 illustrates the notion of distance between two circles.

FIG. 14 illustrates the notion of distance Dist between two circles C and C' with respective centres O and O' and of respective radii R and R'. We have:

$$Dist = OO' - R - R'.$$

Figure 15:
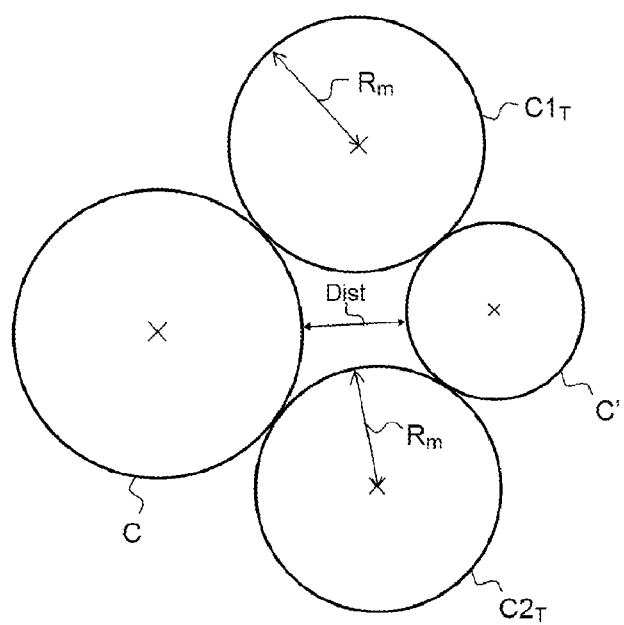
FIG. 15 shows the two external circles tangent to two circles.

There exists an infinity of external circles tangent to two circles C and C', but there exist only two external tangent circles exhibiting a determined radius. FIG. 15 illustrates the two external circles $C1_T$ and $C2_T$ which are tangent to the two circles C and C' of determined radius Rm.

Variants of the method determine possible trajectories of the aircraft, as described hereinbelow, on the basis of external tangent circles.

According to a variant of the method 300 the step 370 of determining the plurality of trajectories comprises the following sub-steps:

Step 376 computes a mean radius Rm on the basis of the departure radius Rd and arrival radius Ra.

The test of the following step 377 compares the distance between the left departure circle and the left arrival circle Dist{CdL–CaL} with twice the mean radius 2·Rm.

If Dist{*CdL−CaL*}<2·*Rm*:

the method determines in sub-step 378 a first external tangent circle $C1_T$ and a second external tangent circle $C2_T$, which are tangent to the departure circle of left type CdL and to the arrival circle of left type CaL and which have a radius equal to the mean radius Rm computed in step 376.

The method thereafter determines:

- a fifth trajectory T5–L $C1_T$ L comprising an initial portion comprising a portion according to the left departure circle CdL, a final portion according to the left arrival circle CaL and an intermediate portion equal to a portion of the first tangent circle $C1_T$,
- a sixth trajectory T6–L $C2_T$ L comprising an initial portion comprising a portion according to the left departure circle CdL, a final portion according to the left arrival circle CaL and an intermediate portion equal to a portion of the second tangent circle $C2_T$.

Figure 16:
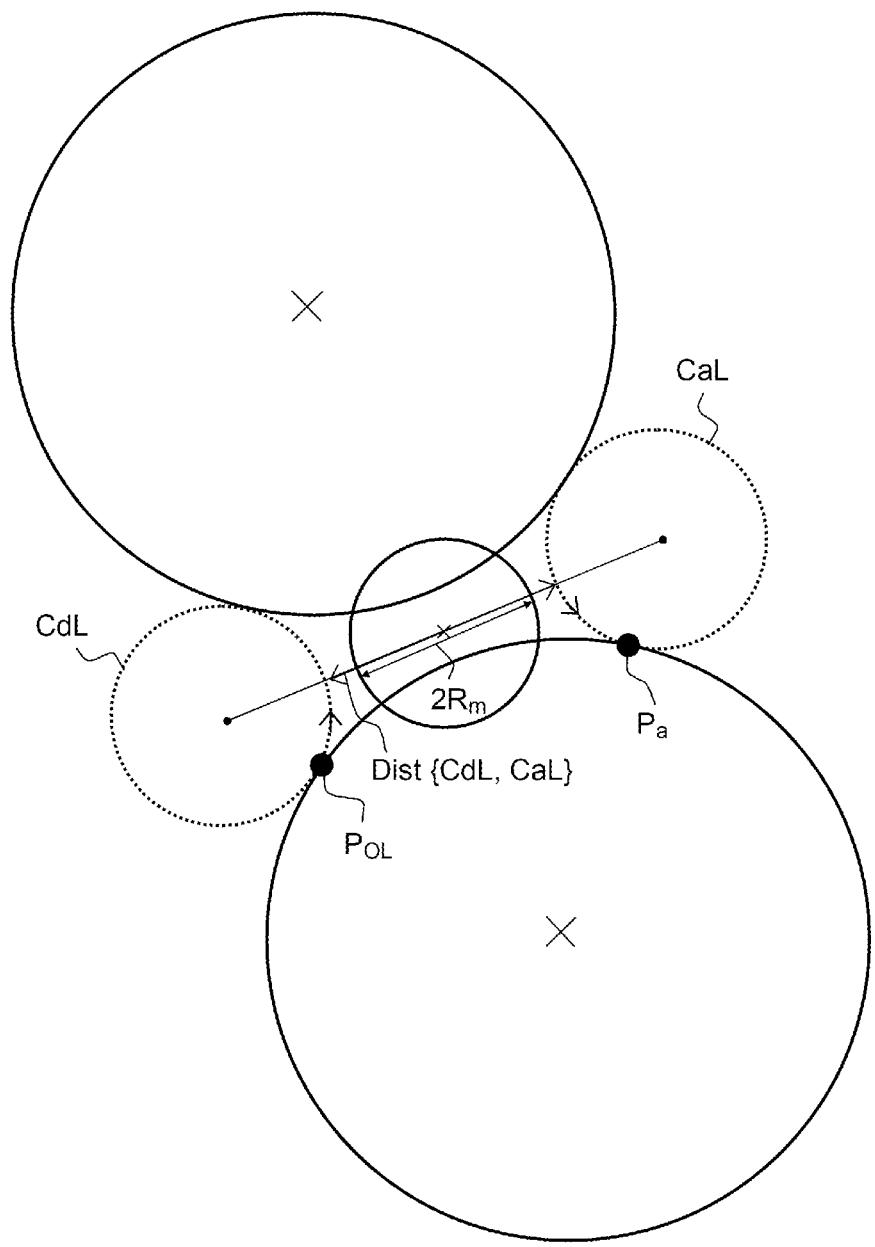
FIG. 16 illustrates a case according to which the method does not compute certain of the trajectories of the method according to the invention.

If Dist{CdL–CaL}>2·Rm, such as illustrated in FIG. 16, the method does not compute the corresponding trajectories, which are always longer than the trajectories obtained on the basis of straight line segments.

According to a variant of the method 300 the step 370 of determining the plurality of trajectories comprises the following sub-steps:

The test of the following step 377 compares the distance between the right departure circle and the right arrival circle Dist{CdR–CaR} with twice the mean radius 2·Rm.

If Dist{*CdR−CaR*}<2·*Rm*:

the method determines in sub-step 381 a third external tangent circle $C3_T$ and a fourth external tangent circle $C4_T$, which are tangent to the departure circle of right type CdR and to the arrival circle of right type CaR and which have a radius equal to the mean radius Rm computed in step 376.

Figure 17:
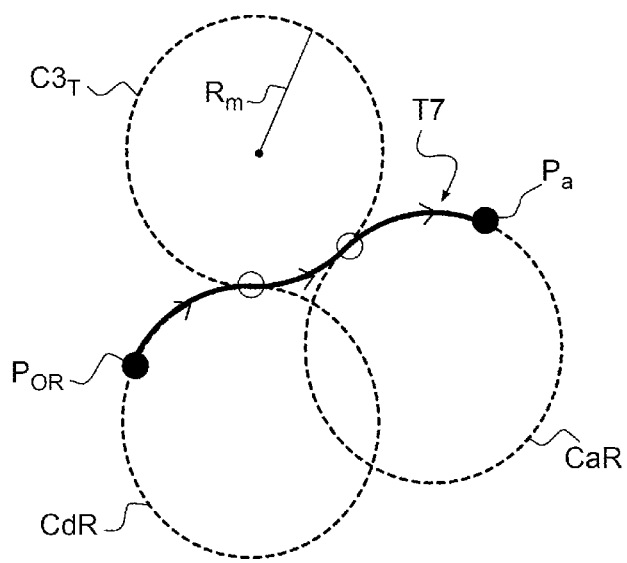
FIG. 17 illustrates the determination of a seventh trajectory according to a preferred variant of the method according to the invention.
Figure 18:
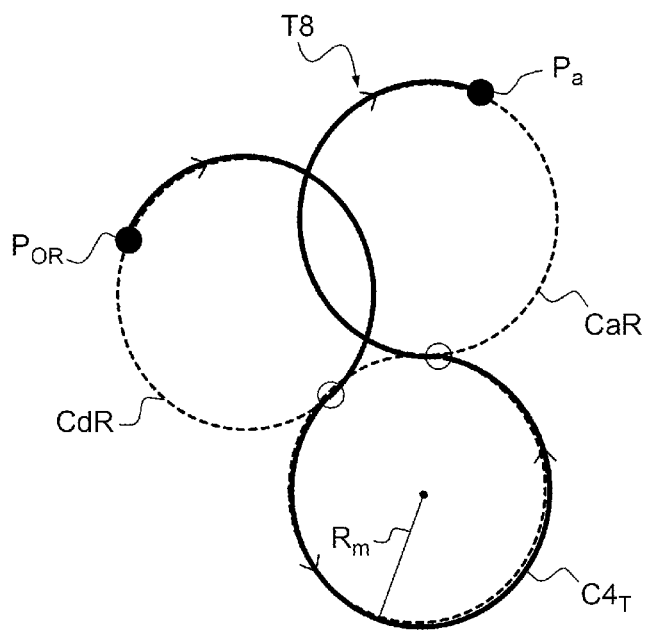
FIG. 18 illustrates the determination of an eighth trajectory according to a preferred variant of the method according to the invention.

The method determines thereafter:

- a seventh trajectory T7–R $C3_T$ R illustrated in FIG. 17, comprising an initial portion comprising a portion according to the right departure circle CdR, a final portion according to the right arrival circle CaR and an intermediate portion equal to a portion of the third tangent circle $C3_T$,
- an eighth trajectory T8–R $C4_T$ R illustrated in FIG. 18 comprising an initial portion comprising a portion according to the right departure circle CdR, a final portion according to the right arrival circle CaR and an intermediate portion equal to a portion of the fourth tangent circle $C4_T$.

If Dist {CdR−CaR}>2·Rm, the method does not compute the corresponding trajectories, which are always longer than the trajectories obtained on the basis of straight line segments.

Advantageously, the mean radius Rm is equal to the algebraic mean of the departure and arrival radii:

$$Rm=(Rd+Ra)/2.$$

Figure 19:
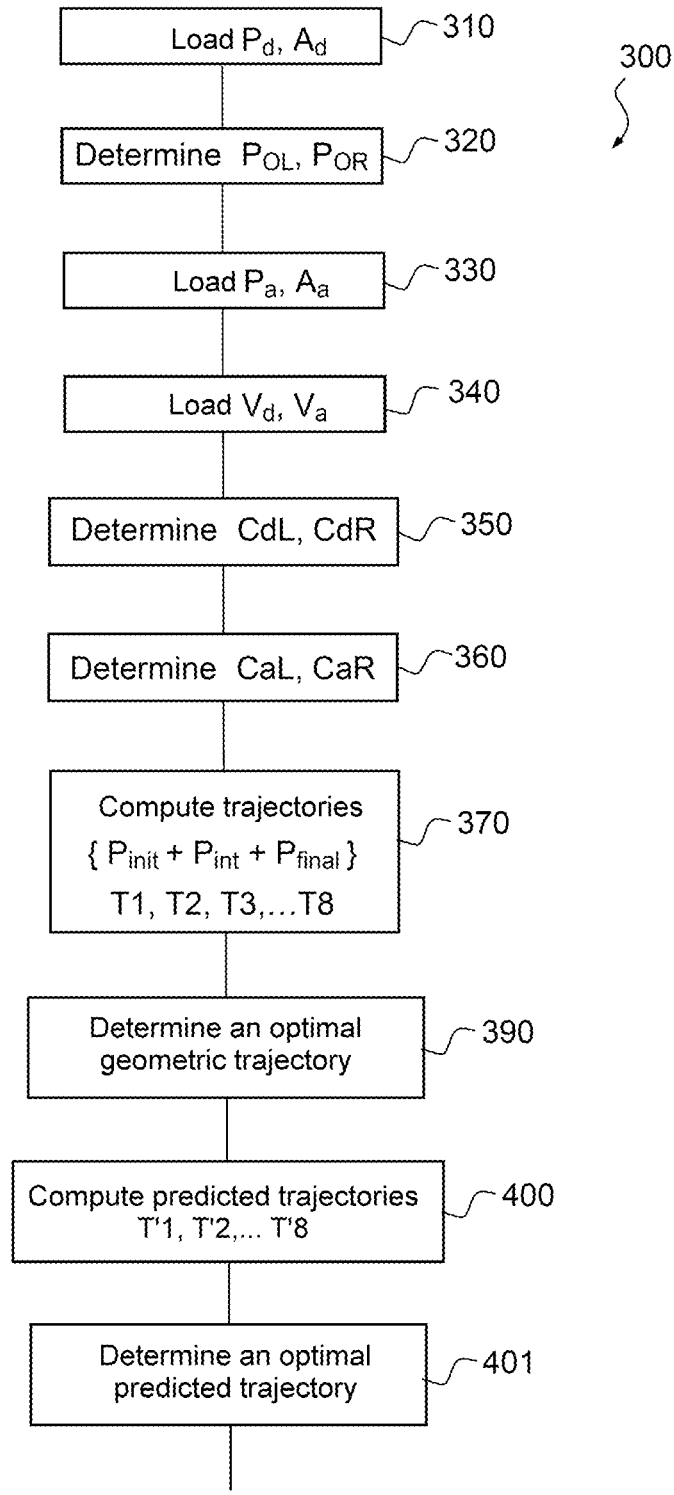
FIG. 19 illustrates a variant of the method according to the invention for which trajectories predicted on the basis of the geometric trajectories are computed.

According to a preferred variant illustrated in FIG. 19, the method 300 according to the invention furthermore comprises a step 390 of determining an optimal geometric trajectory from among the plurality of geometric trajectories computed T1, T2 .... T8 according to a first criterion chosen in the group comprising: the shortest trajectory by distance; the trajectory minimizing an aggregate angle (that is to say with the fewest turns).

According to one option, the first criterion is predetermined, according to another option the first criterion is chosen by the pilot.

As a variant, also illustrated in FIG. 19, the method 300 comprises a step 400 of computing a plurality of predicted trajectories T'1, T'2, ... T'8 of the aircraft on the basis of the plurality of geometric trajectories T1, T2 T8 as a function of a global state of the aircraft. The global state covers for example the speed, the altitude, the mass, and the predictions are carried out on the basis of the equations of flight mechanics in the FMS.

On the basis of the predicted trajectories T1, T'2, ... T'8, the method 300 determines in step 401 an optimal predicted trajectory from among the plurality of trajectories predicted according to a second criterion chosen in the group comprising: the trajectory minimizing fuel consumption; the trajectory minimizing travel time.

According to one option, the second criterion is predetermined, according to another option the second criterion is chosen by the pilot.

The method 300 determines an optimal geometric trajectory and/or an optimal predicted trajectory.

According to one embodiment the departure point Pd corresponds to a current position of the aircraft $P_{curr}$ and the departure angle Ad corresponds to a current direction $A_{curr}$ followed by the aircraft.

According to one embodiment the arrival point Pa and the arrival angle Aa are determined by the pilot.

Figure 20A:
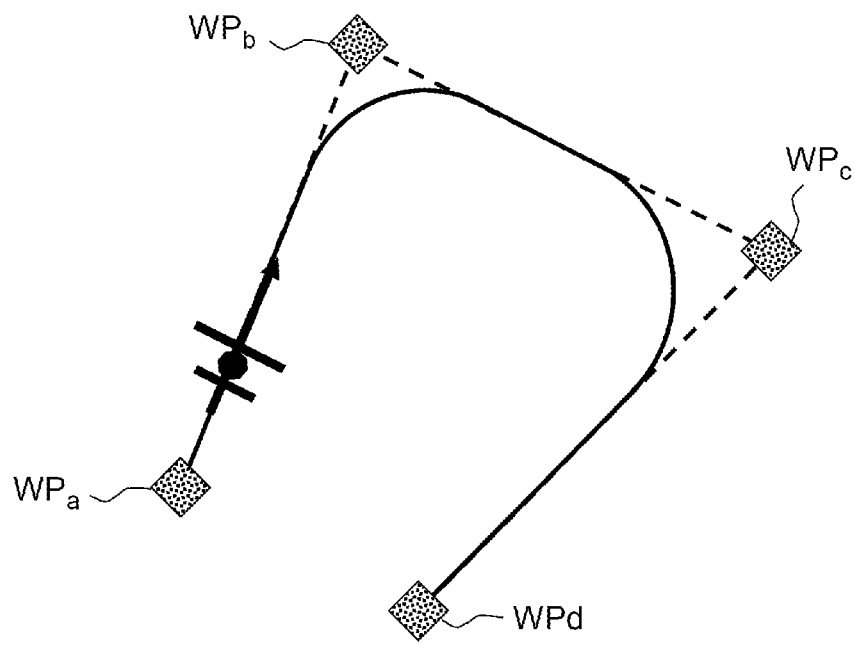
FIGS. 20a-20b illustrate the application of the method according to the invention in a flight plan.

The method 300 might be applied when the aircraft follows a flight plan FP comprising an ordered series of navigation points WPb, WPc, WPd, as illustrated in FIG. 20a. In the example illustrated in FIG. 20a, the points Wpb and WPC must be traversed (or sequenced) without overflight, while the point Wpd must be overflown.

The pilot determines a departure point for the computation of the trajectory which may be a point of the flight plan remaining to be traversed WP0, a point computed by referencing to a distance or a time of a point of the flight plan remaining to be traversed WP0, and or the current position of the aircraft $P_{curr}$.

Figure 20B:
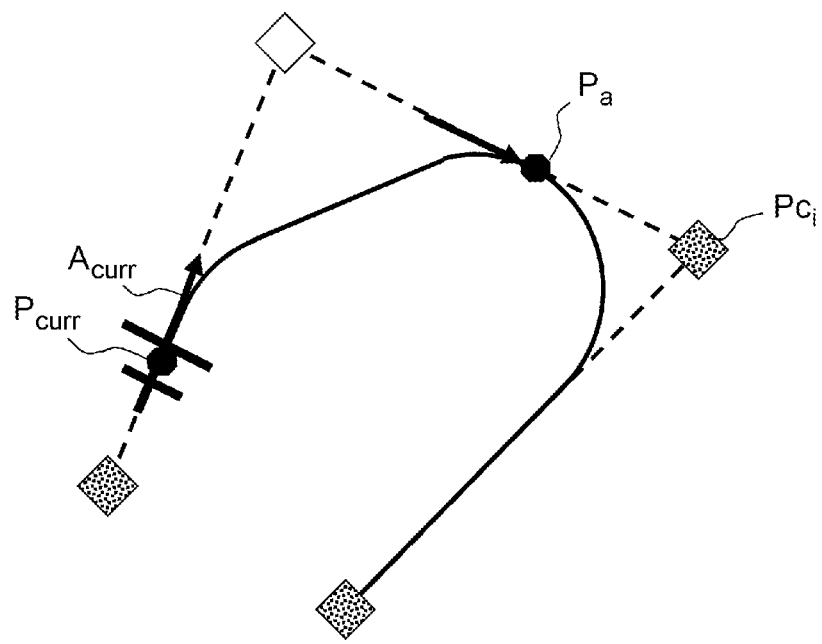

As explained previously, the pilot may decide not to traverse certain points of the flight plan so as to directly rejoin a target navigation point Pci corresponding to a navigation point of the flight plan downstream in the flight plan FP, or a point computed by referencing to a distance or a time of a downstream navigation point of the flight plan. FIG. 20b illustrates the case where the pilot decides to go directly to the point WPc without sequencing the point WPb.

With the target point is associated an operational need defined as the way in which this point must be traversed (sequenced) by the aircraft. The operational need can be defined by default, partially or completely, or chosen by the pilot.

Examples of operational needs are:
overflight of the point or not (overfly);
alignment on the previous or following leg.

Combinations are possible, according to the operational need, such as for example:
Overflight of the point and alignment on the following leg for a start-of-release point or within the framework of an interception of runway axis or of radioelectric approach beam (LOCALIZER for example),
Non overflight of the point and alignment on the previous leg, in such a way that the transition to the point is not modified.

The method might also be applied between any two points of a flight plan guaranteeing a deterministic trajectory, within the framework of a manoeuvre in a constrained lateral corridor (for example a low-altitude flight).

Figure 21:
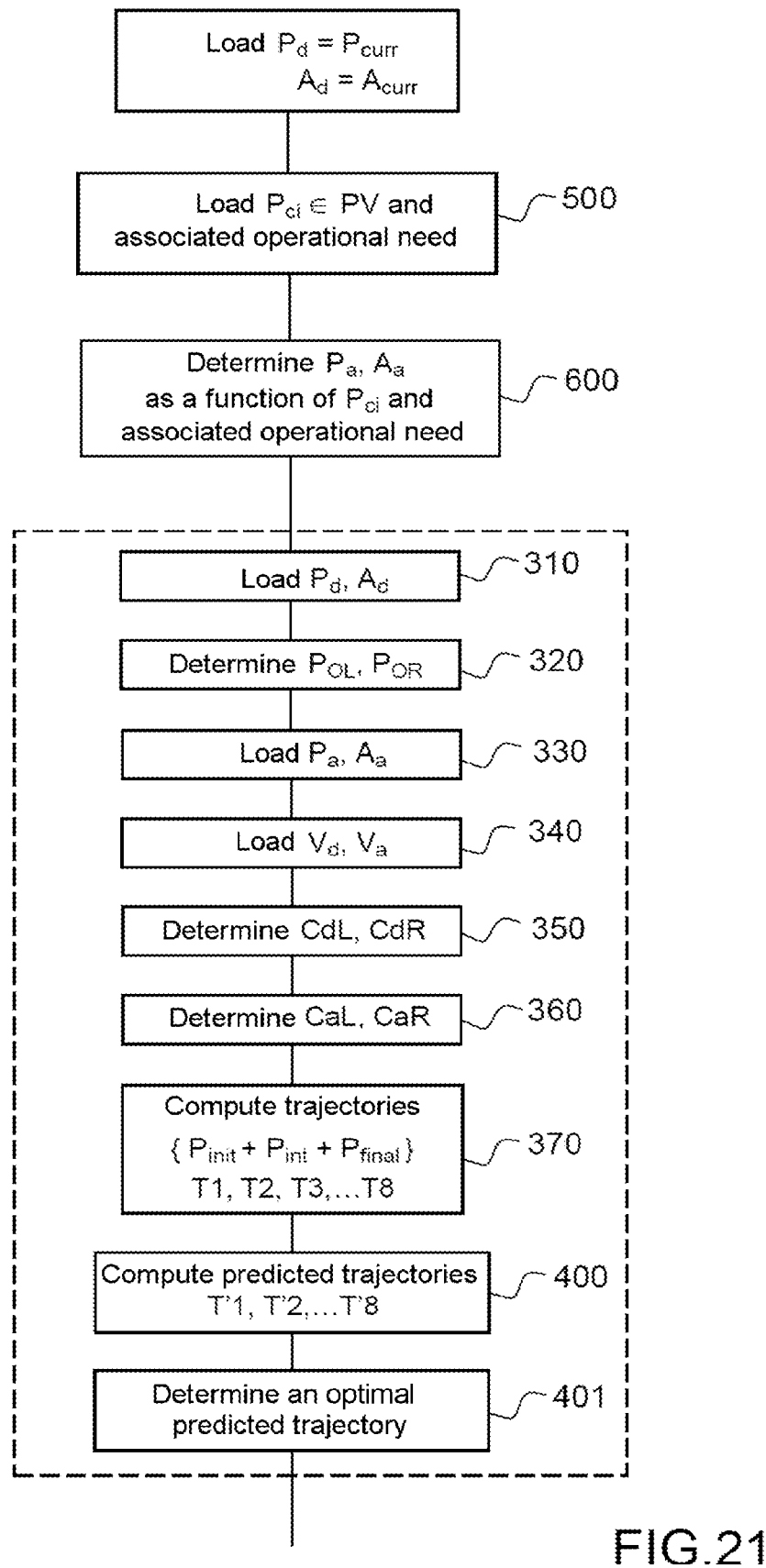
FIG. 21 shows the steps of a variant of the method according to the invention comprising a preliminary step of loading a target point.

Thus as a variant the method 300 comprises a preliminary step 500 consisting in loading this target point Pci, as well as at least one associated operational need, as illustrated in FIG. 21.

Next a step 600 determines the arrival point Pa and the arrival angle Aa, the arrival point being situated upstream of the target point Pci, as a function of the operational need associated with the target point Pci.

The optimal trajectory for going from the departure point to the arrival point is thereafter computed as described hereinabove. Compliance with the alignment constraint Aa at the arrival point allows the aircraft to rejoin the flight plan through an optimized trajectory, as illustrated in FIG. 20b.

An exemplary algorithm for step 600 is as follows:
If the target point must be overflown, then the position of the arrival point Pa to be rejoined corresponds to the position of the target point Pci to be rejoined.
If the alignment must be done on the previous leg then
The arrival course Aa to be rejoined corresponds to the course of the leg leading to the target point
Else (the alignment must be done on the following leg) then
The course to be rejoined Aa corresponds to the course of the leg starting from the target point
Else (the point must not be overflown) then:
If the alignment must be done on the previous leg
The position to be rejoined Pa corresponds to the start of the computed transition between the target point and the following point
The course to be rejoined Aa corresponds to the course at the start of the computed transition between the target point and the following point
Else (the alignment must be done on the following leg) then
It is considered that the point must be overflown.

Figure 22:
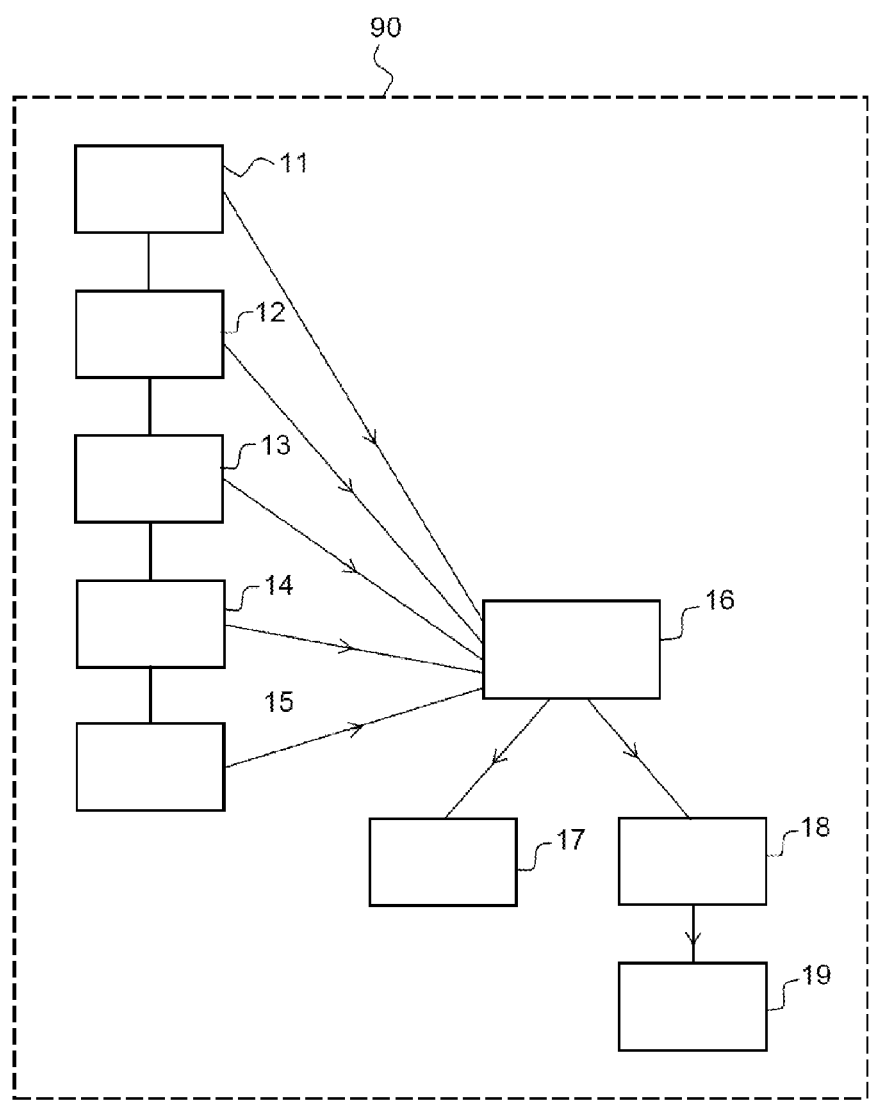
FIG. 22 illustrates an aircraft trajectory computation device according to the invention.

According to another aspect the invention relates to a system 90 for computing trajectory of an aircraft, between a departure point Pd and an arrival point Pa, illustrated in FIG. 22 and comprising:
a module 11 for loading a departure point Pd, a departure angle Ad with vertex the departure point, separating a first reference straight line Refd and a departure straight line Dd oriented according to the sense of displacement of the aircraft at the departure point, and a departure speed Vd of the aircraft,
a module 12 for loading an arrival point Pa, an arrival angle Aa with vertex the arrival point, separating a second reference straight line Refa and an arrival straight line Da oriented according to the sense of displacement of the aircraft at the arrival point, and an arrival speed Va of the aircraft, a module 13 for determining two waypoints P0L, P0R of respectively left and right type on the basis of the departure point Pa, a module 14 for determining two departure circles of respectively left CdL and right CdR type, which are tangent to the oriented departure straight line Dd respectively on the left and on the right, and passing respectively through the waypoint of left type P0L and through waypoint of right type P0R, the said circles exhibiting a departure radius Rd determined on the basis of the departure speed Vd, a module 15 for determining two arrival circles of respectively left and right type CaL, CaR which are tangent to the oriented arrival straight line Da respectively on its left and on its right and passing through the arrival point Pa, the said circles exhibiting an arrival radius Ra determined on the basis of the arrival speed, a module 16 for determining a plurality of continuous geometric lateral trajectories comprising an initial portion Pinit comprising a segment [Pd, P0L/P0R] or not and a portion of a departure circle, a final portion Pfinal equal to a portion of an arrival circle, and an intermediate portion Pint, such that the sense of displacement of the aircraft on the initial portion and the final portion coincides with the sense respectively of the oriented departure straight line Dd at the departure point Pd and the oriented arrival straight line Da at the arrival point Pa.

According to a preferred embodiment, the system 90 furthermore comprises:

a module 17 for determining an optimal geometric trajectory from among the plurality of geometric trajectories according to a first criterion chosen in the group comprising: the shortest trajectory by distance; the trajectory minimizing an aggregate angle, and/or a module 18 for computing a plurality of predicted trajectories of the aircraft on the basis of the plurality of geometric trajectories as a function of a global state of the aircraft coupled to a module 19 for determining an optimal predicted trajectory from among the plurality of trajectories predicted according to a second criterion chosen in the group comprising: the trajectory minimizing fuel consumption; the trajectory minimizing travel time.

The system 90 can be integrated into the modules FPLN 102, TRAJ 105 and PRED 106 of an FMS. Preferably the system 90 is integrated into the module TRAJ 105.

According to another aspect, the invention relates to a computer program product, the computer program comprising code instructions making it possible to perform the steps of the method according to the invention.

The invention claimed is:

1. A method of computing an aircraft trajectory for an optimal flight geometry, the said method being executed during a flight of an aircraft by an on-board flight management computer, between a departure point (Pd) and an arrival point (Pa), comprising the steps:

loading in the flight management computer the departure point (Pd) and a departure angle (Ad) with a vertex at the departure point, separating a first reference straight line (Refd) and a departure straight line (Dd) oriented according to the aircraft travel direction at the departure point, determining with the flight management computer two waypoints (P0L, P0R) of respectively left and right type on a basis of the departure point (Pd), loading in the flight management computer the arrival point (Pa) and an arrival angle (Aa) with a vertex at the arrival point, separating a second reference straight line (Refa) and an arrival straight line (Da) oriented according to the aircraft travel direction at the arrival point, loading in the flight management computer a departure speed (Vd) and an arrival speed (Va) of the aircraft, determining with the flight management computer two departure circles of respectively left (CdL) and right (CdR) type, which are tangent to the oriented departure straight line (Dd) respectively on the left and on the right, and passing respectively through the waypoint of left type (P0L) and through waypoint of right type (P0R), the said circles exhibiting a departure radius (Rd) determined on a basis of the departure speed (Vd), determining with the flight management computer two arrival circles of respectively left and right type (CaL, CaR) which are tangent to the oriented arrival straight line (Da) respectively on its left and on its right and passing through the arrival point (Pa), the said circles exhibiting an arrival radius (Ra) determined on a basis of the arrival speed, determining with the flight management computer a plurality of continuous geometric lateral trajectories comprising an initial portion (Pinit) comprising a portion of a departure circle, a final portion (Pfinal) equal to a portion of an arrival circle, and an intermediate portion (Pint), such that the aircraft travel direction on the initial portion and the final portion coincides with the direction respectively of the oriented departure straight line (Dd) at the departure point (Pd) and the oriented arrival straight line (Da) at the arrival point (Pa), computing with the flight management computer a plurality of predicted trajectories on a basis of the plurality of geometric trajectories, by using equations of flight mechanics for the aircraft, being function of a global state of the aircraft comprising speed, altitude and mass of the aircraft during the flight, and communicating with the flight management computer at least one of the plurality of predicted trajectories to at least one of the following: an autopilot system to control a flight of the aircraft and a man-machine interface for display to the pilot for control of the aircraft.

2. The method according to claim 1, in which the said waypoints of left (P0L) and right (P0R) type correspond to the departure point (Pd) translated respectively by a left translation distance (dL) and by a right translation distance (dR), as a function of the aircraft wing position at the departure point (Pd).

3. The method according to claim 2, in which the step of determining the two waypoints (P0L, P0R) comprises:

loading a state of the position of the wings of the aircraft at the chosen departure point corresponding to an angle of inclination of the wings with respect to the horizon, and in which:

when the state of the aircraft is wings level, the right (dR) and left (dL) translation distances are identical and equal to a first distance (d1) of turning of the aircraft, the waypoints of right and left type coinciding, when the state of the aircraft is a turn engaged of a type from among left and right:

the translation distance is less than or equal to the first distance (d1) for the waypoint of the said type, the translation distance is equal to a second distance (d2,d'2) of turning for the waypoint of the other type.

4. The method according to claim 1, in which the radius of the departure and arrival circles is computed according to the following formula:

$$Ri = V^2/g \cdot tg(\phi)$$

With i=d or a,
R departure radius Rd or arrival radius Ra
V departure speed Vd or arrival speed Va
g gravitational constant
$\phi$ angle of roll of the aircraft for carrying out a turn.

5. The method according to claim 1, in which the step of determining the plurality of trajectories comprises a sub-step comprising:
determining a first (T1-LSL) trajectory comprising an initial portion comprising a portion according to the left departure circle (CdL), a final portion according to the left arrival circle (CaL), and an intermediate portion equal to the straight line segment externally tangent both to the left departure circle (CdL) and to the left arrival circle (CaL) when the departure circle and the arrival circle are not included one in the other,
and a second (T2-RSR) trajectory comprising an initial portion comprising a portion according to the right departure circle (CdR), a final portion according to the right arrival circle (CaR), and an intermediate portion equal to the straight line segment externally tangent both to the right departure circle (CdR) and to the right arrival circle (CaR) when the departure circle and the arrival circle are not included one in the other.

6. The method according to claim 1, in which the step of determining the plurality of trajectories comprises, when the left departure circle (CdL) is disjoint from the right arrival circle (CaR), a sub-step comprising:
determining a third trajectory (T3-LSR) comprising an initial portion comprising a portion according to the left departure circle (CdL), a final portion according to the right arrival circle (CaR) and an intermediate portion equal to the straight line segment internally tangent to the left departure circle (CdL) and to the right arrival circle (CaR),
and furthermore comprises, when the right departure circle (CdR) is disjoint from the left arrival circle (CaL), a sub-step comprising:
determining a fourth trajectory (T4-RSL) comprising an initial portion comprising a portion according to the right departure circle (CdR), a final portion according to the left arrival circle (CaL), and an intermediate portion equal to the straight line segment internally tangent to the right departure circle (CdR) and to the left arrival circle (CaL).

7. The method according to claim 1, in which the step of determining the plurality of trajectories furthermore comprises a sub-step comprising:
computing a mean radius (Rm) on the basis of the departure and arrival radii.

8. The method according to claim 7, in which the step of determining the plurality of trajectories furthermore comprises the sub-steps comprising:
determining a first ($C1_T$) and a second ($C2_T$) tangent circles external to the departure and arrival circle of left type and of radius equal to the mean radius (Rm), when the departure circle (CdL) and arrival circle (CaL) of left type are a value of less than twice the mean radius (Rm) apart, determining a fifth (T5-L $C1_T$ L) and a sixth (T6-L $C2_T$ L) trajectories comprising an initial portion comprising a portion according to the left departure circle (CdL), a final portion according to the left arrival circle (CaL) and an intermediate portion equal to a portion respectively of the first ($C1_T$) and of the second ($C2_T$) external tangent circle.

9. The method according to claim 7, in which the step of determining the plurality of trajectories furthermore comprises the sub-steps comprising:
determining a third ($C3_T$) and a fourth ($C4_T$) tangent circles external to the departure and arrival circle of right type and of radius equal to the mean radius (Rm), when the departure circle (CdR) and arrival circle (CaR) of right type are a value of less than twice the mean radius (Rm) apart,
determining a seventh (T7-R $C3_T$ R) and an eighth (T8-R $C4_T$ R) trajectories comprising an initial portion comprising a portion according to the right departure circle (CdR), a final portion according to the right arrival circle (CaR) and an intermediate portion equal to a portion respectively of the third ($C3_T$) and of the fourth ($C4_T$) external tangent circle.

10. The method according to claim 7, in which the mean radius is equal to sum divided by two of the departure radius (Rd) and of the arrival radius (Ra).

11. The method according to claim 1, comprising a step comprising determining a geometric trajectory from among the plurality of geometric trajectories defining an optimal trajectory, said optimal trajectory being chosen according to a first criterion chosen in the group comprising: the shortest trajectory by distance; the trajectory minimizing an aggregate angle.

12. The method according to claim 1, furthermore comprising a step comprising determining a predicted trajectory from among the plurality of predicted trajectories defining an optimal predicted trajectory, said optimal predicted trajectory being chosen according to a second criterion chosen in the group comprising: the trajectory minimizing fuel consumption; the trajectory minimizing travel time.

13. The method according to claim 1, in which the departure point (Pd) corresponds to a current position of the aircraft and the departure angle (Ad) corresponds to a current direction followed by the aircraft.

14. The method according to claim 1, in which the arrival point (Pa) and the arrival angle (Aa) are determined by the pilot.

15. The method according to claim 1, in which the said aircraft follows a flight plan (FP) comprising an ordered series of navigation points (WPb, WPc, WPd . . . ) remaining to be traversed comprising preliminary steps comprising:
loading a target navigation point (Pci) corresponding to a navigation point of the flight plan remaining to be traversed and at least one associated operational need,
determining the arrival point (Pa) and the arrival vector (Va), the arrival point being situated upstream of the target point (Pci), as a function of the said operational need associated with the target point.

16. A system for computing trajectory of an aircraft between a departure point (Pd) and an arrival point (Pa), comprising a flight management computer and lines of non-transitory computer code intended to be executed on the said computer, the said lines of computer code comprising instructions for executing a computing of an aircraft trajectory for an optimal flight geometry between a departure point (Pd) and an arrival point (Pa), said instructions comprising:

loading in the flight management computer the departure point (Pd) and a departure angle (Ad) with a vertex at the departure point, separating a first reference straight line (Refd) and a departure straight line (Dd) oriented according to the aircraft travel direction at the departure point, determining with the flight management computer two waypoints (P0L, P0R) of respectively left and right type on the basis of the departure point (Pd), loading in the flight management computer the arrival point (Pa) and an arrival angle (Aa) with a vertex at the arrival point, separating a second reference straight line (Refa) and an arrival straight line (Da) oriented according to the aircraft travel direction at the arrival point, loading in the flight management computer a departure speed (Vd) and an arrival speed (Va) of the aircraft, determining with the flight management computer two departure circles of respectively left (CdL) and right (CdR) type, which are tangent to the oriented departure straight line (Dd) respectively on the left and on the right, and passing respectively through the waypoint of left type (P0L) and through waypoint of right type (P0R), the said circles exhibiting a departure radius (Rd) determined on the basis of the departure speed (Vd), determining with the flight management computer two arrival circles of respectively left and right type (CaL, CaR) which are tangent to the oriented arrival straight line (Da) respectively on its left and on its right and passing through the arrival point (Pa), the said circles exhibiting an arrival radius (Ra) determined on the basis of the arrival speed, determining with the flight management computer a plurality of continuous geometric lateral trajectories comprising an initial portion (Pinit) comprising a portion of a departure circle, a final portion (Pfinal) equal to a portion of an arrival circle, and an intermediate portion (Pint), such that the aircraft travel direction on the initial portion and the final portion coincides with the direction respectively of the oriented departure straight line (Dd) at the departure point (Pd) and the oriented arrival straight line (Da) at the arrival point (Pa), computing with the flight management computer a plurality of predicted trajectories by using the equations of flight mechanics for the aircraft on the basis of the plurality of geometric trajectories as a function of a global state of the aircraft, and communicating with the flight management computer at least one of the plurality of predicted trajectories to at least one of the following: an autopilot system to control the flight of the aircraft and a man-machine interface for display to the pilot for control of the flight of the aircraft.

* * * * *